(No Model.)
S. A. CHASE.
GALVANIC BATTERY.
No. 357,550.                               Patented Feb. 8, 1887.
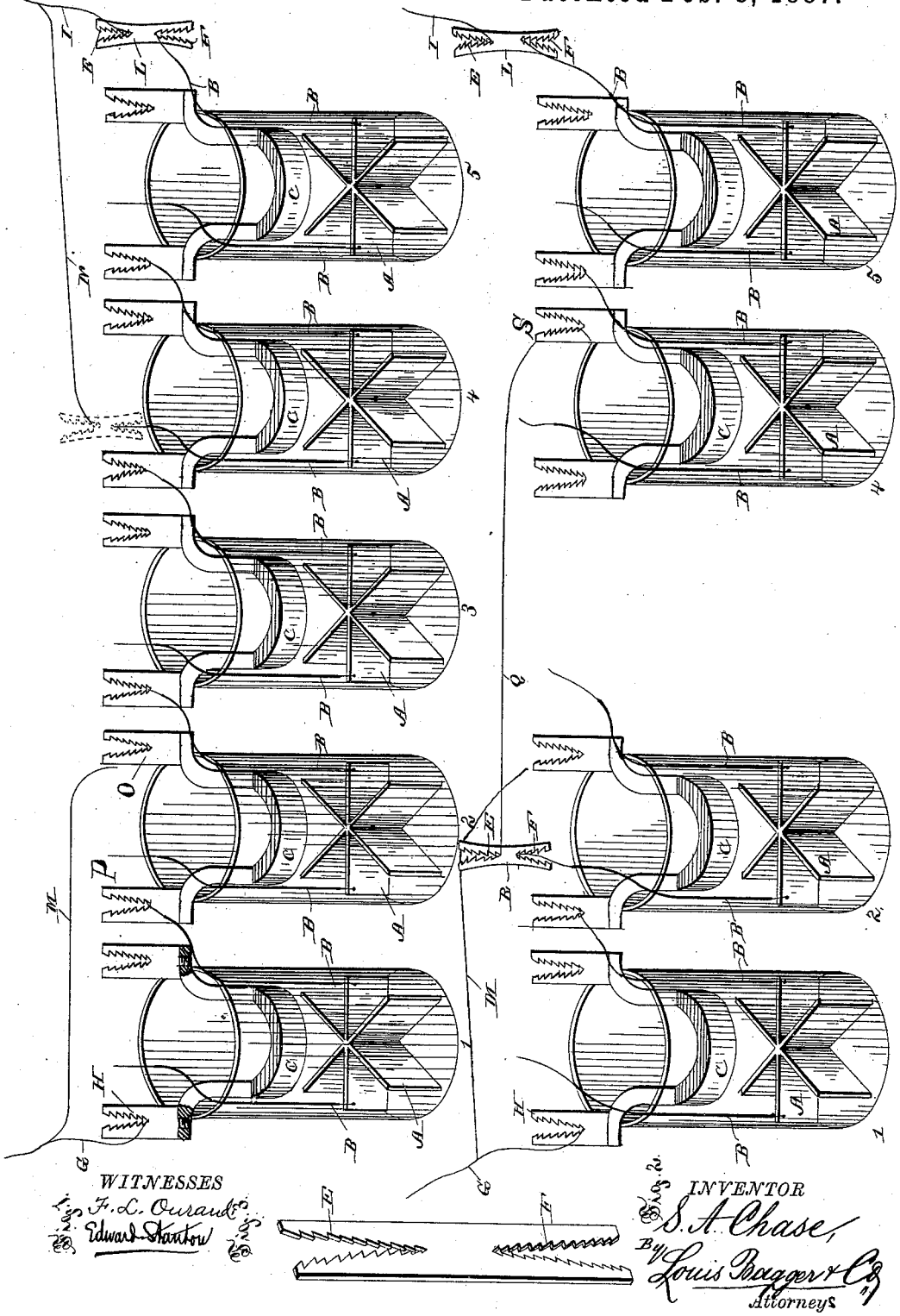
WITNESSES
F. L. Durand
Edward Stanton
INVENTOR
S. A. Chase
By Louis Bagger & Co.
Attorneys

UNITED STATES PATENT OFFICE.

SIDNEY A. CHASE, OF EVART, MICHIGAN, ASSIGNOR OF ONE-HALF TO WILLIAM R. MAPES, OF SAME PLACE.

GALVANIC BATTERY.

SPECIFICATION forming part of Letters Patent No. 357,550, dated February 8, 1887.

Application filed August 10, 1886. Serial No. 210,535. (No model.)

*To all whom it may concern:*

Be it known that I, SIDNEY A. CHASE, a citizen of the United States, and a resident of Evart, in the county of Osceola and State of Michigan, have invented certain new and useful Improvements in Galvanic Batteries; and I do hereby declare that the following is a full, clear, and exact description of the invention, which will enable others skilled in the art to which it appertains to make and use the same, reference being had to the accompanying drawings, which form a part of this specification, and in which—

Figure 1 is a representation of my improved galvanic battery, in which five cells are shown connected in series. Fig. 2 is a similar view showing the manner of connecting the cells which remain after the removal of one; and Fig. 3 is a perspective view of the clip used in making connections between elements at the removal of a cell.

Like letters of reference indicate corresponding parts throughout the figures.

My invention has relation to galvanic batteries; and it consists in the improved construction of parts and in the improved mode and means for connecting the elements of said battery, as will be hereinafter fully set forth.

The object of my invention is to provide a continuously-operating battery for use in connection with my fire-alarm systems, for which I filed applications in the United States Patent Office, April 20, 1886, Serial No. 199,471, and June 14, 1886, Serial No. 205,108, or for use in connection with any apparatus which requires a perpetual current, said battery to be so constructed that at any time one or more cells may be removed for repairs, or any desired number of cells added thereto, without interfering with the generation of the current. I attain these objects by providing both elements of each cell with two wire-connections, and by providing readily attachable and detachable double clips for joining splice-wires to said elements when it is desired to remove a cell from the battery.

In the accompanying drawings, 1, 2, 3, 4, and 5 represent, respectively, the cells of the battery, in which A signifies the copper element; B, the insulated wires, two for each cell, leading from said element up through the liquid of the cell; and C represents the zinc element provided with upwardly-extending arms which curve outwardly at their upper ends. Said ends afford means for supporting the zinc in its place and provide for securely and rigidly attaching to said element the spring-metal clips. Each of said clips is made of a plate of spring metal, and has a V-shaped notch in its upper end. The edges of this notch are toothed. The teeth on one side of the notch alternate with those on the other side, as seen at E, Fig. 3; or the points on one side may directly oppose those on the other, as seen at F, the other end of the same double clip.

The cells may be joined in the usual manner, one only of the wires or clips from each of the elements being in use at the same time, the others remaining free till a cell is removed from or added to the battery.

In the drawings the cells are shown as joined in series, the end G of the line-wire being connected to the clip H directly, and the other end, I, to one of the wires B of cell 5, by means of the double clip L. To the ends of the line-wire G and I are respectively attached the branch wires M and N, which serve for connections to the cells 2 and 4 when either end cell is to be removed. If it is desired to remove cell 1, the branch M is placed in the free clip O of cell 2, the end of the line-wire removed from clip H, and the engaged wire B of cell 1 removed from the clip P of cell 2. If cell 5 is to be removed, the branch N is connected with the free wire B of cell 4 by a double clip, (shown in dotted lines,) and then cell 5 may be disengaged from the battery in a similar manner as was cell 1. In removing an intermediate cell, as cell 3, a splice-wire, Q, is connected by a double clip, R, Fig. 2, to the free wire B of cell 2 and the clip S of cell 4. In this manner any cell or cells of the battery may be removed, and by a similar manipulation of the free clips on the zinc elements the free wires from the copper ones, splice wires, and double clips, any number of cells may be added to the battery without interruption to the general current.

Having thus fully described my invention, I claim—

1. In a cell of a galvanic battery, the combination of the copper element provided with two insulated wires, and the zinc element provided with two distinct clips, one of said wires and one of said clips being in the circuit and the other wire and the other clip being adapted to be placed in circuit, for the purpose of removing a cell from the battery without breaking the circuit, as shown and described.

2. In a cell of a galvanic battery, the combination, with the zinc element provided with upwardly-extending arms curved outwardly at their upper ends, of clips adapted to be permanently secured to said ends, one of said clips being in the circuit and the other being adapted to be placed in it, for the purpose of removing a cell from the battery without breaking the circuit, as set forth.

3. In a cell of a galvanic battery, the combination, with the zinc element provided with upwardly-extending arms, of clips formed of spring metal and each provided with a toothed V-shaped notch at its upper end, as and for the purpose set forth.

4. The combination, with an element in a cell of a galvanic battery, of a clip formed from a plate of spring metal provided with a toothed V-shaped notch, as shown and described.

5. A double clip for joining the ends of electric wires, consisting of a plate of spring metal formed at each end with a deep V-shaped notch provided with teeth along its edges, the teeth upon one edge of the notch alternating with the teeth upon the other edge, as shown and described.

6. The combination, with a galvanic battery in which each element of each cell is provided with two wire-connections and two clips, one of each of which is in the circuit and the other is free, of a line-wire and a branch line secured thereto, the line-wire being connected with one of the wire-connections of one of the cells and the branch being adapted to be connected with the free wire-connections of one of the other cells, for the purpose of removing a cell from the battery without breaking the circuit, as and for the purpose set forth.

7. The combination, with a galvanic battery in which each element of each cell is provided with two wire-connections and two clips, one of each of which is in the circuit and the other is free, of a double clip adapted to be secured to the free wire-connection of one of the cells, and a splice-wire adapted to connect said double clip with the free clip of another cell, for the purpose of removing one or more cells from the battery without breaking the circuit, as and for the purpose set forth.

In testimony that I claim the foregoing as my own I have hereunto affixed my signature in presence of two witnesses.

SIDNEY A. CHASE.

Witnesses:
C. F. STOUT,
IRVIN CHASE.